United States Patent [19]

Phillips

[11] 4,276,351

[45] Jun. 30, 1981

[54] POLYVINYL BUTYRAL PLASTICIZED WITH TETRAETHYLENEGLYCOL DI-2-ETHYLHEXANOATE

[75] Inventor: Thomas R. Phillips, Belpre, Ohio

[73] Assignee: E. I. Du Pont de Nemours and Company, Wilmington, Del.

[21] Appl. No.: 164,140

[22] Filed: Jun. 30, 1980

[51] Int. Cl.³ .................. C08F 45/38; B32B 17/10; B32B 27/42
[52] U.S. Cl. .................. 428/437; 260/31.8 R; 260/31.4 R; 525/61; 526/315; 260/31.6
[58] Field of Search .................. 428/437, 426; 525/61; 526/315; 260/31.8 R, 31.6 R, 31.4 R

[56] References Cited

U.S. PATENT DOCUMENTS

| | | | |
|---|---|---|---|
| 2,045,130 | 6/1936 | Fix | 428/437 |
| 2,120,927 | 6/1938 | Blair | 260/31.4 R |
| 2,202,160 | 5/1940 | Marks | 260/31.4 R |
| 2,274,672 | 3/1942 | Dennison | 428/437 |
| 2,412,469 | 12/1946 | Nicholl | 260/31.4 R |
| 3,178,334 | 4/1965 | Bragaw | 428/437 |
| 3,296,211 | 1/1967 | Winkler | 260/31.8 R |
| 3,361,565 | 1/1968 | Umberger | 430/503 |
| 3,384,532 | 5/1968 | Martins | 428/437 |
| 3,525,703 | 8/1970 | Iwami | 260/5 |
| 3,551,281 | 12/1970 | Takaura | 428/437 |
| 3,578,621 | 5/1971 | Stapfer | 260/31.8 R |
| 3,841,955 | 10/1974 | Coaker | 428/437 |
| 4,055,430 | 10/1977 | Hasegawa | 430/340 |
| 4,073,858 | 2/1978 | Chung | 428/423.1 |
| 4,230,771 | 10/1980 | Phillips | 428/437 |

FOREIGN PATENT DOCUMENTS 1309615  3/1973  United Kingdom .................. 428/437

OTHER PUBLICATIONS

Union Carbide, Technical Bulletin "Flexol Plasticizer 4G0", Jul. 1965.
Modern Plastics Encycl., 1978–1979, p. 696.

Primary Examiner—Ellis P. Robinson

[57] ABSTRACT

Polyvinyl butyral plasticized with tetraethyleneglycol di-2-ethylhexanoate and laminates thereof with one or more sheets of glass.

7 Claims, 1 Drawing Figure

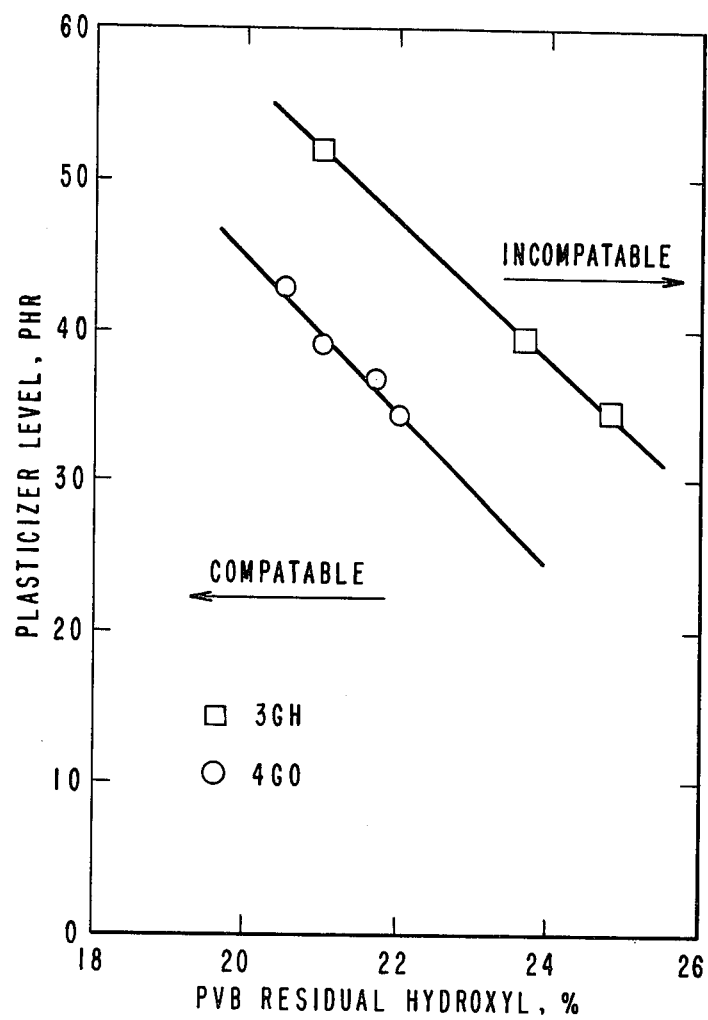

POLYVINYL BUTYRAL PLASTICIZED WITH TETRAETHYLENEGLYCOL DI-2-ETHYLHEXANOATE

BACKGROUND OF THE INVENTION

Polyvinyl butyral is widely used in combination with one or more layers of glass to provide a composite which is resistant to shattering. The polyvinyl butyral typically contains a plasticizer to provide a balance of mechanical properties satisfactory for subsequent handling and performance requirements. It has been found that while certain plasticizers such as triethyleneglycol di-2-ethylbutyrate (3GH) perform satisfactorily in combination with polyvinyl butyral, the materials and processing requirements necessary in their production result in high cost.

SUMMARY OF THE INVENTION

The instant invention provides plastic compositions comprising polyvinyl butyral and, in compatible admixture therewith, a plasticizer comprising as least about 10 weight percent tetraethyleneglycol di-2-ethylhexanoate of the formula:

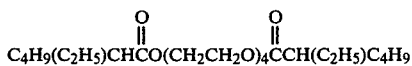

The present invention also provides laminates of this material with at least one layer of glass.

BRIEF DESCRIPTION OF THE FIGURE

The FIGURE is a graphical representation of the compatibility of the compositions used in the present invention with polyvinyl butyral as compared with 3GH plasticizer.

DETAILED DESCRIPTION OF THE INVENTION

The present invention is based on the discovery of the particular suitability of tetraethylene glycol di-2-ethylhexanoate as a plasticizer for polyvinyl butyral. The composition has the following formula:

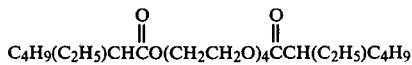

This composition is commercially available, for example, from Union Carbide as Flexol Plasticizer 4GO. It can also be prepared by bringing into contact tetraethyleneglycol and 2-ethylhexanoic acid. These compounds are believed to react according to the equation:

$$2(C_4H_9[C_2H_5]CHCO_2H) + HO(CH_2CH_2O)_4H \longrightarrow$$

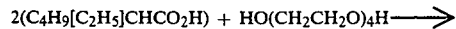
 $+ 2H_2O$

While the desired product will generally be obtained in all proportions of the reactants, for maximum purity of the desired tetraethyleneglycol di-2-ethylhexanoate at least two moles of 2-ethylhexanoic acid should be present for each mole of tetraethyleneglycol. Higher concentrations of the 2-ethylhexanoic acid, for example, up to about 2.5 moles 2-ethylhexanoic acid for each mole of tetraethyleneglycol, are preferred when no additional catalyst or solvent is used in the reaction.

The reaction of 2-ethylhexanoic acid and tetraethyleneglycol can be carried out without a catalyst. However, the rate and ease of reaction are facilitated by the presence of a catalyst. The catalyst can, in the most basic situation, be a minor excess of the 2-ethylhexanoic acid itself. Other catalysts which can be used include a variety of acids, including sulfuric, formic, polyphosphoric, or p-toluenesulfonic acid and combinations of such acids. The catalyst, when used, is generally present in an amount equal to about from 0.01 to 5.0 weight percent of the total reactants.

A solvent in addition to the reactants can be used in the preparation of the tetraethyleneglycol di-2-ethylhexanoate if desired. The solvent should be inert to the reactants and should preferably form an azeotrope with the water that is formed in the course of the reaction. Particularly satisfactory and convenient are organic solvents such as toluene, xylene, and benzene.

The preparation of the compound used in the present invention can be carried out at ambient temperatures and pressures. However, to facilitate the reaction and for ease of removal of the water formed in the reaction, the synthesis is preferably carried out at elevated temperatures of about from 50° to 300° C. Particularly satisfactory is a temperature equivalent to the boiling point of an azeotrope of water with either the 2-ethylhexanoic acid or solvent used in the reaction.

The water formed by the reaction of the two components is preferably removed during the course of the reaction to both increase the rate of reaction, drive the reaction to completion and to monitor its progress by measurement of the quantity of water generated. The water is conveniently removed by distillation of the azeotrope of water and acid or solvent.

After completion of the reaction, the tetraethyleneglycol di-2-ethylhexanoate can be recovered as a viscous colorless oil. If desired, residual solvent, water, catalyst or other impurities can be removed by conventional purification techniques, including filtration through anhydrous magnesium sulfate or charcoal or by vacuum distillation. The product as prepared frequently contains minor quantities, for example, up to 10 weight percent of various unreacted glycols such as ethylene, diethylene, triethylene and tetraethylene glycols; unreacted acid as well as the mono- and di-esters thereof.

The tetraethyleneglycol di-2-ethylhexanoate (4GO) can be incorporated into polyvinyl butyral as a plasticizer using techniques that are usually used for other plasticizers. It can be used with the polyvinyl butyrals well known in the art, and described, for example, in U.S. Pat. No. 2,400,957. The polyvinyl butyral can have a wide range of hydroxyl contents extending, for example, about from 15 to 30 percent calculated as polyvinyl alcohol. The polyvinyl butyral and plasticizer are present in quantities which result in a compatible admixture. The quantities of plasticizer which can be added to any polyvinyl butyral vary according to the residual hydroxyl content of the polyvinyl butyral as illustrated in the Figure. Thus, in polyvinyl butyral having a residual hydroxyl content of 20 percent, as much as 45 parts by weight of 4GO plasticizer can be added per each hundred parts of polyvinyl butyral. However, for polyvinyl butyral resins having 24 weight percent residual hydroxyl content, a maximum of only about 28 parts of 4GO plasticizer can be added per hundred parts of polyvinyl butyral resin. At or below these maximum quantities or at intermediate points along the line indicating maximum compatible plasticizer level, the quantity of plasticizer can be adjusted to achieve the desired level of polymer sheet characteristics.

The plasticized polyvinyl butyral sheeting can be laminated to one or more layers of glass according to the procedures generally used in the art and illustrated, for example, in U.S. Pat. Nos. 2,293,656, 3,838,091 and 4,107,366.

The instant invention provides excellent plasticized polyvinyl butyral. It has been found that the 4GO plasticizer is compatible with polyvinyl butyral over a wide range of hydroxyl contents, and provides sheeting with excellent dimensional stability, tensile strength and stiffness at plasticizer concentrations fully comparable to those required, for example, using triethyleneglycol di-2-ethylbutyrate (3GH). In addition, if desired, the present compositions can be used in conjunction with triethyleneglycol di-2-ethylbutyrate.

The present invention is further illustrated in the following specific examples, in which parts and percentages are by weight unless otherwise indicated. In these examples, the following procedures and tests were used.

PVB Residual Hydroxyl (Weight Percent as PVA): ASTM D1396.

Tensile Strength: ASTM D1708 with samples conditioned and run at 20.6±0.6° C. and 23.5±2% RH instead of 23±2° C. and 50±5% RH.

Flow Rate: ASTM D1238 using conditions (P) for some reported values and a temperature of 150° C. with the standard orifice and 5000 g weight for other values as noted.

Pummel Adhesion: SAE J1208

Edge Stability: ANSI Z26.1 with samples tested for four weeks instead of two.

Compatibility: Test samples are prepared by first blending 50 g of dry polyvinyl butyral flake with a plasticizer in a 0.47 l bottle on a roll mill for 2 hours. The blend is then compounded in a sigma-blade Brabender mixer for 10 minutes at 135° C. The resulting melt blend is pressed into 30-mil (0.76 mm) films using a hydraulic press with the following cycle: (1) preheat—6 minutes, 180° C., 5 psig (34.5 kPa, gage), (2) mold—1.5 minutes, 180° C. and 100 psig, and (3) cool—4 minutes, 20° C. and 100 psig (689 kPa, gage). A 2×3-inch (5.1×7.6 cm) film is exposed for 72 hours at 100% relative humidity and 0° C. The films are blotted between absorbent paper. The paper is then visually examined for evidence of a stain caused by exudation of the plasticizer. A compatible blend exhibits no stain.

Accelerated Edge Cloud/Edge Stability: The laminate is immersed in commercial, ammoniacal alcohol glass cleaning solution at 60° C. for 30 days. The laminate is then removed from the solution and the resulting edge cloud is measured immediately. After standing at ambient conditions for an additional 30 days, the laminate is reexamined for edge delaminations.

Tensile Creep (% Elongation): Test sheeting samples nominally 0.03 inch (0.76 mm) thick are conditioned for 4 hours at 68±2° F. (20.0±1.1° C.). The samples are then die cut to 0.75±4 inches (1.9×10.2 cm), marked and clipped into the test oven at 65±° C. for 1 hour. A 10 psi (69 kPa) load is applied to each specimen and the elongation measured at 30 minutes. The results are calculated by dividing the gage length after testing by the initial gage length and multiplying by 100.

Plasticizer Content by Vacuum Distillation: Molded or extruded sheeting samples are dried in an oven at 60° C. for 30–60 minutes and weighed into a test tube. An accurately tared receiver is then attached. The tube is placed in a 285±2° C. heating block and vacuum (13 Pa minimum) is applied. After 45 minutes, the receiver containing evolved plasticizer is disconnected and weighed. The parts of plasticizer per hundred parts resin is calculated by multiplying the weight of collected plasticizer by 100 and dividing by the difference between the original sample weight minus the weight plasticizer.

5% Secant Modulus: ASTM D882 with samples conditioned and run at 20.6±0.6° C. and 23.5±2% RH instead of 23±2° C. and 50±5% RH.

EXAMPLE 1 & COMPARATIVE EXAMPLE A

In Example 1, 43.3 parts of tetraethyleneglycol di-2-ethylhexanoate was blended with polyvinyl butyral having a hydroxyl content of 21.1 percent. The liquid plasticizer was blended with dried polyvinyl butyral flake and the resulting blend formed into sheeting. A portion of the sheeting was laminated between two layers of glass using techniques conventional in the preparation of laminated safety glass. The laminate was prepared by placing 30-mil film between two pieces of 12×12×0.1" (30.5×30.5×0.25 cm) glass, and treating with the following heat and pressure cycle:

(1) 1 minute at 200° C. then press between nip rolls,
(2) 3 minutes at 200° C., then press again between nip rolls, and (3) 9 minutes at 135° C. and 225 psig (1.55 MPa gage) in an oil autoclave.

In Comparative Example A, the general procedure of Example 1 was repeated, except that the plasticizer used was triethyleneglycol di-2-ethyl butyrate (3GH). The plasticizer was used in a concentration of 44.0 parts per hundred in a polyvinyl butyral film having a hydroxyl content of 23.2 percent.

The films and laminates from Example 1 and Comparative Example A were tested, and the results summarized in Table I.

TABLE I

| Example | 1 | A |
|---|---|---|
| Plasticizer | 4GO | 3GH |
| Sheeting Properties | | |
| PVB Hydroxyl, % | 21.1 | 23.2 |
| Plasticizer, phr | 43.3 | 44.0 |
| Alkalinity titer, cc | 134 | 130 |
| Flow Rate, g/10 min. | 2.1 | 1.9 |
| Caliper mm | 0.77 | 0.77 |
| mils | 30.2 | 30.4 |
| Tensile Strength, MPa | 26.8 | 27.1 |
| psi | 3889 | 3930 |
| 5% Secant Modulus, MPa | 5.1 | 4.3 |
| psi | 738 | 626 |
| Creep, % | 49.0 | 38.9 |
| Laminate Properties | | |
| Moisture, % | 0.42 | 0.42 |
| Mean Break Height, m | 5.8 | 5.3 |
| at 72° F. (22.2° C.) feet | 18.9 | 17.3 |
| Pummel Adhesion | 3 | 3 |
| Edge Cloud, 64ths in.(mm) (Coffin) | 24(9.5) | 24(9.5) |
| Edge Stability, let-goes | None | None |

EXAMPLES 2-5 & COMPARATIVE EXAMPLES B-D

The general procedure for Example 1 was repeated using polyvinyl butyral of varying hydroxyl content. In each case, the concentration of plasticizer was adjusted to about the maximum concentration for a compatible blend, as indicated in Table II.

TABLE II

| Example | PVB Hydroxyl, % | Plastizier Type | Concentration, PHR |
| --- | --- | --- | --- |
| 2 | 20.5 | 4GO | 43.0 |
| 3 | 21.0 | 4GO | 39.0 |
| 4 | 21.7 | 4GO | 37.0 |
| 5 | 22.0 | 4GO | 34.5 |
| B | 21.0 | 3GH | 52.0 |
| C | 24.8 | 3GH | 34.5 |
| D | 23.4 | 3GH | 39.5 |

The results of Examples 2-5 and Comparative Examples B-D are summarized in the Figure, showing the levels of compatibility of 3GH and 4GO plasticizers.

I claim:

1. A plastic composition comprising polyvinyl butyral and, in compatible admixture therewith, a plasticizer comprising at least about 10 weight percent tetraethyleneglycol di-2-ethylhexanoate of the formula:

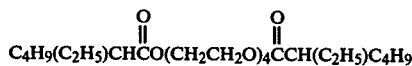

2. A composition of claim 1 wherein the polyvinyl butyral has a hydroxyl content of about from 15 to 30 percent calculated as polyvinyl alcohol.

3. A composition of claim 2 wherein the polyvinyl butyral has a hydroxyl content of about from 20 to 25 weight percent, calculated as polyvinyl alcohol.

4. A composition of claim 1 wherein the plasticizer consists essentially of tetraethyleneglycol di-2-ethylhexanoate in a quantity of about from 20 to 55 parts per hundred of polyvinyl butyral.

5. A composition of claim 4 wherein the tetraethyleneglycol di-2-ethylhexanoate is present in a quantity of about 30 to 45 parts per hundred of polyvinyl butyral.

6. A laminar structure comprising at least one layer of glass and a layer of a plastic composition comprising polyvinyl butyral and, in compatible admixture therewith, a plasticizer comprising at least about 10 weight percent tetraethyleneglycol di-2-ethylhexanoate of the formula:

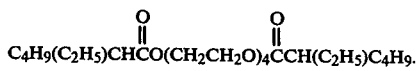

7. A laminar structure of claim 6 comprising two layers of glass and one layer of the plastic composition.

* * * * *